United States Patent [19]

Viertel et al.

[11] Patent Number: 5,004,288

[45] Date of Patent: Apr. 2, 1991

[54] SUN VISOR FOR MOTOR VEHICLE HAVING A SLIDABLE MAIN BODY

[75] Inventors: Lothar Viertel, Altforweiler; Peter Kaiser, Wermelskirchen, both of Fed. Rep. of Germany; Patrick Welter, La Chambre, France

[73] Assignee: Gebr. Happich GmbH, Fed. Rep. of Germany

[21] Appl. No.: 452,784

[22] Filed: Dec. 19, 1989

[30] Foreign Application Priority Data

Dec. 19, 1988 [DE] Fed. Rep. of Germany ....... 3842706

[51] Int. Cl.$^5$ .............................................. B60J 3/02
[52] U.S. Cl. .................................. 296/97.11; 296/97.8
[58] Field of Search ..................... 296/97.1, 97.8, 97.9, 296/97.11, 97.6, 97.12, 97.13

[56] References Cited

U.S. PATENT DOCUMENTS

| | | | |
|---|---|---|---|
| 2,894,576 | 7/1959 | Williams | 296/97.6 X |
| 2,941,839 | 6/1960 | Pendlebury | 296/97.6 |
| 3,032,371 | 5/1962 | Berridge et al. | |
| 3,865,428 | 2/1975 | Chester | 296/97.11 R |
| 4,330,148 | 5/1982 | LaMont | 296/97.6 |
| 4,364,598 | 12/1982 | Viertel | 296/97.9 |
| 4,390,202 | 6/1983 | Flowersday et al. | 296/97.13 |
| 4,617,699 | 10/1986 | Nakamura | 296/97.9 X |
| 4,736,979 | 4/1988 | Harvey | 296/97.6 |
| 4,910,648 | 3/1990 | Van Order | 296/97.9 X |

FOREIGN PATENT DOCUMENTS

| | | |
|---|---|---|
| GM7611282 | 4/1976 | Fed. Rep. of Germany. |
| 3235997 | 3/1984 | Fed. Rep. of Germany. |
| 3603852 | 8/1987 | Fed. Rep. of Germany. |
| 3711570A1 | 10/1988 | Fed. Rep. of Germany. |

Primary Examiner—Margaret A. Focarino
Assistant Examiner—Gary C. Hoge
Attorney, Agent, or Firm—Ostrolenk, Faber, Gerb & Soffen

[57] ABSTRACT

A sun visor for automotive vehicles, including a sun visor body and a separate carrier body. The carrier body and sun visor body being attached to permit longitudinal translation of the visor body with respect to the carrier body while prohibiting rotation of the carrier body apart from the visor body around a swivel axis. Slide bearing rails between the carrier body and visor body permit the longitudinal translation. The arms of the U shape slide rails are cooperatingly shaped to define ball-receiving grooves which enable the translation of the visor body with respect to the carrier body. A sun visor swivel shaft is supported at one end of the carrier body. An outer support pin, supported at the opposite end of the carrier body, is also longitudinally movable with respect to the carrier body and is also received in a hole in the end of the outer support pedestal, which hole has a lateral radial opening.

18 Claims, 2 Drawing Sheets

SUN VISOR FOR MOTOR VEHICLE HAVING A SLIDABLE MAIN BODY

BACKGROUND OF THE INVENTION

The present invention relates to a sun visor for motor vehicles having a sun visor body which is swingable around a horizontal axis, is displaceable parallel to that axis and is also mounted for swinging around an approximately vertical axis. The visor body is supported on an approximately L shaped sun visor shaft, in a swivel bearing pedestal, which is adapted to be fastened to the body of the vehicle. An outer support pin at the opposite end of the visor body from the sun visor shaft is received in an outer support pedestal, which is also adapted to be fastened to the body of the vehicle.

Sun visors of this type are known from German Applications OS 32 35 997 and OS 36 03 852. These known sun visors have proven suitable in practice but have disadvantages. They have a relatively complicated construction and are comprised of a large number of individual parts, which means high manufacturing expenses. It is frequently desirable to be able to shift the sun visor body parallel to the swing axis even when it is positioned in front of the windshield. In known sun visors, however, displacement of the sun visor body is only provided when it is positioned in front of a side window. Finally, it would be desirable if conventional sun visors were of better appearance.

SUMMARY OF THE INVENTION

Starting from a sun visor of the aforementioned type, it is the object of the present invention to develop the sun visor such that, starting from its normal use position before the front window, the visor body can be pushed to the left and right parallel to its axis of swing, and can be moved in that manner particularly when it assumes its anti-dazzle position in front of a windshield and when its outer support pin is mounted in the bearing support of the outer support pedestal. Further, the visor should have as few individual parts as possible and should be manufactured more easily and at more favorable cost than the known embodiments and at the same time be of a particularly good and attractive appearance.

This object is achieved with the invention. The sun visor body has one longitudinal edge, with a first slide bearing element on that one edge. The first slide bearing element is coupled, to be fixed against turning while being translatable, on an elongated carrier body which extends parallel to the sun visor body. The carrier body has a respective second slide bearing element to which the first slide bearing element is slidably coupled. At one end region, the carrier body includes a mounting bore in which an arm of the sun visor shaft is supported for free turning. But, the carrier body is fixed there against translation. At the other end region, the carrier body is equipped with the outer support pin which can be introduced into a mounting receiver in the outer support pedestal.

The features of the invention provide particular advantages. In this connection, there is a functional separation between the support elements for the swinging movement of the sun visor body, on the one hand, and those for the movement of translation thereof, on the other hand. The support elements can thus be designed relatively simply, corresponding only to their functional requirements and unaffected by the functional requirements of the other support elements. This avoids the difficulties described, for instance in German Application OS 32 35 997.

Furthermore, it is essential that the sun visor body can be started from its basic position to be shifted toward the left and right as well as forward and backward parallel to the axis of swing. If the sun visor body is in front of the windshield, it can be moved both in the direction toward the inner mirror, which is generally arranged in the longitudinal center line of the vehicle, and toward one of the front side windows, whereby optimal protection against dazzling of the vehicle occupants is obtained. When the sun visor body is directed approximately parallel to a side window, it can be shifted both forward in the direction toward the A column and rearward in the direction toward the B column. The anti-dazzle effect of the sun visor of the invention could thus be optimized, as compared with known prototypes.

The invention provides a substantial simplification in the manufacture of the sun visor. Thus, for instance, a standard sun visor shaft can be used for which no translation of the sun visor body is provided. Simplification of the manufacture of the sun visor body results from the measures in accordance with the invention. Because the sun visor shaft and the outer support pin are mounted in the carrier body, and because support elements for the sun visor shaft need no longer be taken into consideration here and because an outer support lug is no longer necessary, the sun visor body can be manufactured substantially more simply and at more favorable cost. This is particularly true also for application of a covering over the sun visor body, for which only a circumferential welding seam need be provided. This also simplifies the welding electrode.

The sun visor body can be swung from the windshield to a side window, and vice versa, regardless of the translation displacement of the sun visor body with respect to the carrier body, since the position of the outer bearing pin with respect to that of the outer support pedestal remains unaffected.

The external appearance of the sun visor may also be improved by the present invention. In particular, there would be no need for a long, freely exposed shaft arm which would also be visible upon displacement of the sun visor body.

The slide bearing guidance for the sun visor body on the carrier body can consist, for instance, of slide bearing elements which engage each other in dovetail manner. The slide bearing can also be provided with a guide tube having a longitudinal slot within which is disposed a slide block adapted to the cross-sectional opening of the slot. Preferably, the slide bearing elements comprise slide rails of different width, and each of U shape as seen in cross section. The open side of the narrower slide rail is inserted into the open side of the wider slide rail. The arms of the U-shaped slide rails are developed with longitudinally extending grooves which receive balls and which have end stops. The balls are seated in the arms of a ball separator, which is developed in the shape of a U rail, is located between the arms of the wider slide rail, engages over the arms of the narrower slide rail and has a substantially shorter length than the slide rails. In this way, the sun visor body is connected in a longitudinally displaceable manner to the carrier body only via the balls, providing a reliable connection which permits easy displaceability.

In a further development of the invention, the carrier body has one end with a bearing hole which is open at one end to receive one arm of the sun visor shaft. At right angles to that bearing hole, there is an insertion opening, accessible from below, for insertion of a detent spring over the shaft, which clamps over the arm of the sun visor shaft then present in the bearing hole. The spring is secured against rotating along with the sun visor shaft by its being held in the carrier body.

At its other end, the carrier body has a second bearing hole, which is aligned with the first bearing hole, for receiving the other support pin. That pin is received in an axially moveable manner in the second bearing hole. In the region of the second bearing hole for the outer support pin, the wall of the carrier body has a slot like opening through which an operating pin is passed. The operating pin is fastened at one end to the outer support pin. At its other end, the operating pin has a handle which permits axial displacement of the operating pin along the slot opening and of the operating pin along with outer support pin.

In another embodiment of the invention, the mounting receiver of the outer support pedestal comprises a blind hole having a wall with a lateral radial slot opening in the entrance region of the hole. The outer support pin can be swung out through that radial slot opening in order to enable swinging of the sun visor body, together with the carrier body, from the front windshield to a front side window. Due to the axial displaceability of the outer support pin and the blind hole like development (in regions) of the bearing receiver of the outer support pedestal, it is now no longer possible for the outer support pin to turn out of the bearing receiver upon the swinging of the sun visor body, as was formerly frequently the case, for instance, if the alignment of the axial line is not exact.

As a further development of the invention, the sun visor body can be developed as a plastic foam part which has dowel elements, or the like, inserted within the foam in order to receive fastening elements for fixing the positions of the slide bearing element to be arranged on the sun visor body. As an alternative, the sun visor body may also be comprised of a plastic injection molding comprised of a single piece of two shells which are assembled together. In the latter case, a connection by fastening elements for the corresponding slide element can be produced simply and at low cost by the spraying of regions around it.

In a further development of the invention, the carrier body preferably comprises a plastic injection molding which is formed of a single piece on which the slide bearing element is fastened, for instance, by a clip, adhesive, ultrasonic, threaded, push-in or similar attachment. The sun visor shaft and the detent spring are in this case fixed on the carrier body preferably by spraying around them.

The appearance of the sun visor of the invention is improved if the sun visor body preferably has a covering of material, such as plastic foil, flat textile, leather, or the like, and if the visor body terminates at one end approximately with the outside of the swivel bearing pedestal and at the other end approximately at the outside of the outer support pedestal in its normal position.

Finally, a further improvement in the appearance of the sun visor and an expansion of its function, particularly valuable in combination with a cosmetic mirror arranged on the sun visor body, derives from the outer bearing pedestal being provided on its front side with a receiving chamber having a cover of light translucent material for an illuminating device which is arranged below it and which can be connected to the electrical system of the vehicle.

Other objects and features of the invention are explained below with reference to an embodiment shown in the drawings.

DESCRIPTION OF A PREFERRED EMBODIMENT

Figure 1:
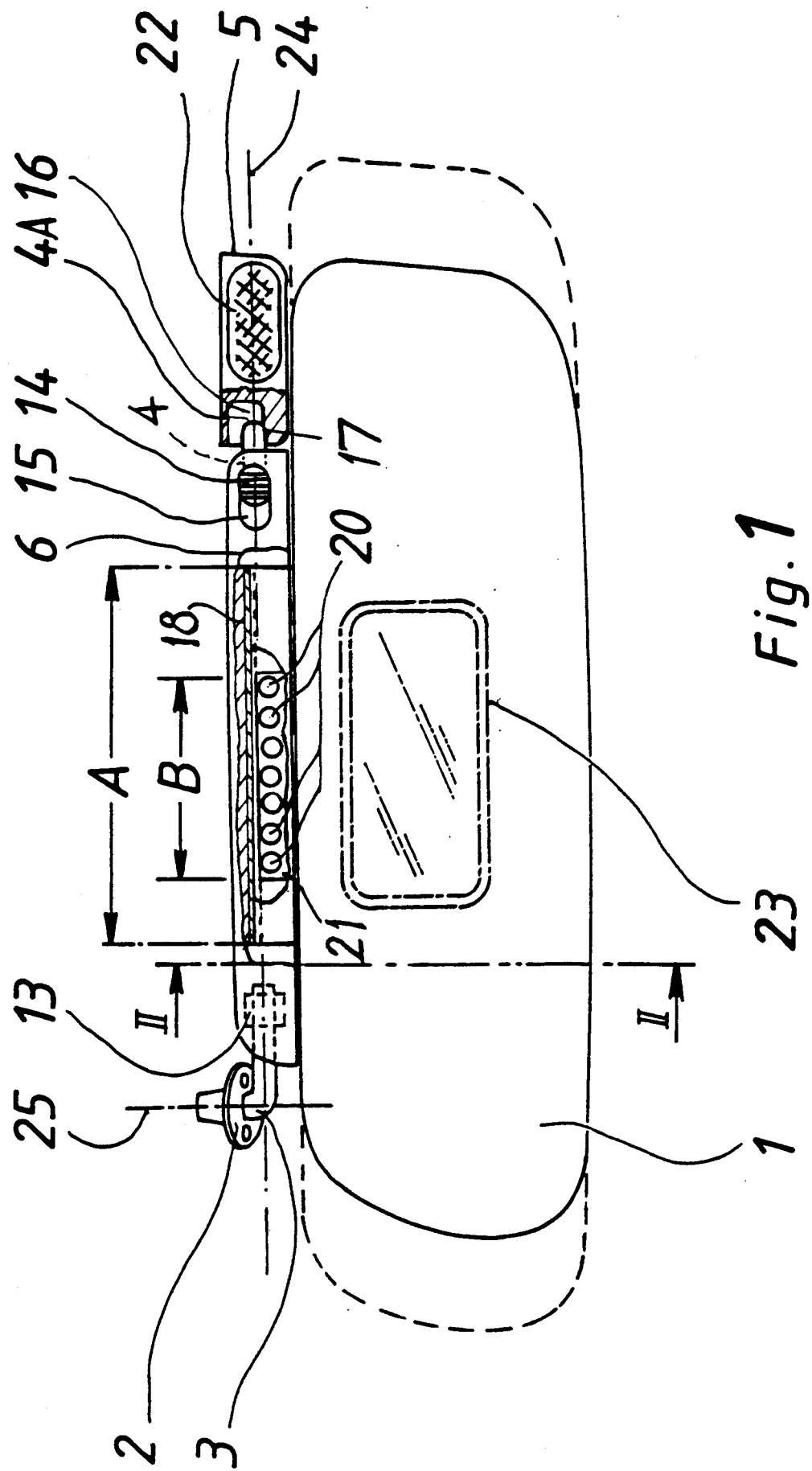
FIG. 1 is a side view of a complete sun visor including the invention.
Figure 2:
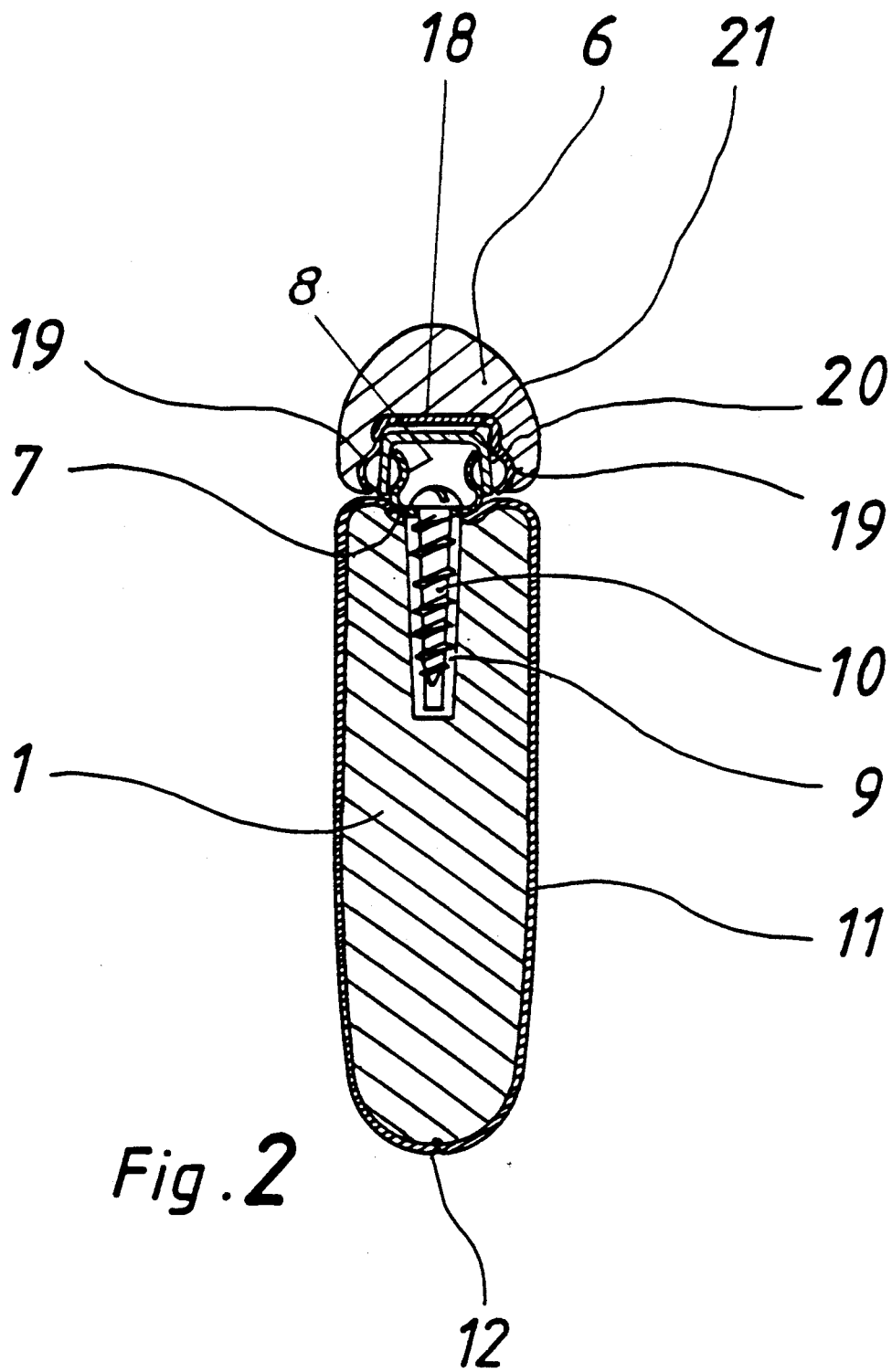
FIG. 2 is a section through the sun visor, approximately along the line II—II of FIG. 1.

The sun visor includes a sun visor body 1, a swivel bearing pedestal 2 attachable to the vehicle body above the front window, a sun visor shaft 3 at one end of the sun visor for joining the visor body and the pedestal, an outer support pin 4 at the opposite longitudinal end of the sun visor, an outer support pedestal 5 also attachable to the vehicle body above the front window for receiving the outer support pin and a carrier body 6.

The carrier body 6 is developed as a separate part from and is connected by a slide bearing means with the sun visor body 1, which is also produced as a separate part. The sun visor body 1 is provided along one longitudinal side, particularly on the top side adjacent the carrier body 6, with a slide bearing element, which is preferably developed as a slide rail 7 having a U-shaped cross section. The arms of the slide rail 7 are provided with inwardly directed, longitudinally extending grooves 8. The slide rail 7 is dependably fastened to the sun visor body 1, for instance, by means of dowel elements 9 arranged in the sun visor body 1 and screws 10 which engage in the dowels.

The sun visor body 1 can be developed as a plastic injection molding, possibly of shell construction, or, as shown, of a foam plastic part. The sun visor body 1 has a covering 11 on its outside, which is comprised, for instance, of two plastic foil blanks. The plastic foil blanks are held together by a peripheral weld seam 12.

The carrier body 6 is preferably comprised of a plastic injection molding, although it can also be developed as a shaped sheet metal part. On the left side of FIG. 1, the long arm of the L-shaped sun visor shaft 3 extends into the carrier body 6 and not into the visor body 1. That shaft 3, as well as the swivel bearing pedestal that receives the shaft, are of conventional construction and therefore are not further described. The long arm of the sun visor shaft 3 can have at least one flat. That arm is gripped over on the flat by an ordinary detent spring 13 of U shape. The carrier body 6 has recesses for the sun visor shaft 3 and for the detent spring 13. The spring is held stationary in the carrier body and its biased grip on the shaft 3 prevents swing of the visor body. As an alternative, the long arm of the sun visor shaft 3 and the detent spring 13 may be fixed on the carrier body 6 by extrusion coating.

As shown at the right hand side of FIG. 1, the carrier body 6 is further provided, at its end opposite the end having the shaft 3, with the outer support pin 4. The outer support pin 4 is received, to be guided for axial movement, in a hole in the carrier body 6. Through a further pin, not shown in detail, the pin 4 bears a radially directed handle 14, which is developed as a slide head. The pin of the handle 14 passes through a slot opening 15 in the carrier body 6 and movement of the handle along the slot moves the pin 4 axially. The axial displaceability of the outer support pin 4 makes it possible to develop the support receiver of the outer support pin pedestal 5 as a blind hole 16. The entrance region of the blind hole 16 has a radial slot opening 17, which enables the outer support pin 4 in its unlocked position to be withdrawn from the outer support pedestal in order to be able to swing the sun visor body 1 together with the carrier body 6 toward the side window. The outer support pin 4 is provided with end engagements including pin 4A.

The carrier body 6 has a slide rail 18 arranged on its bottom. The slide rail 18, like the slide rail 7 of the visor body, is of U shape. The arms of the rail 18 are provided with outwardly directed grooves 19. The U shape of the slide rail 7 is narrower than that of the slide rail 18. The open side of the rail 7 engages into the open side of the slide rail 18. The slide rails 7 and 18 are held together by bearing balls 20, which are guided in the grooves 8 and 19 and by the arms of a U-shaped ball separator 21. The balls 20 not only produce the connection but also make it possible to push and translate the sun visor body 1 to the left and right, as indicated by the dash lines. The region of the length of the slide rail on the sun visor body 1 and on the carrier body 6 is indicated approximately by A in FIG. 1. B approximately indicates the region of the length of the ball separator 21 which moves freely along with step down transmission upon the displacement of the sun visor body 1. The grooves 8 and 19 have end stops formed on both sides by indentations, or the like, so that the sun visor body 1 cannot be completely withdrawn from the carrier body 6.

As further shown in FIG. 1, the outer support pedestal 5 is provided with an illuminating device, of which only the light window 22 can be noted. This enables the mirror 23, indicated merely by dashdot lines in the sun visor body 1, to be used even in the dark. As can be seen in the drawings, the visor body 1 between its top and bottom longitudinal edges is substantially taller than the carrier body 6 between its top and bottom longitudinal edges. It is the visor body 1 which is adapted for blocking light.

FIG. 1 shows the sun visor body 1 in its normal position of use in solid line. It can be moved to the left or right from this position of use, via the above described slide bearing means, to block the disturbing incidence of light. These movements do not affect the sun visor shaft 3 and the outer support pin 4, which therefore remain in the position shown. Furthermore, the sun visor body 1 can be swung into the position of nonuse via the swing axis 24, which is defined by the long arm of the sun visor shaft 3 and the outer support pin 4 and therefore, of course, by the holes in the carrier body which receive the shaft 3 and the pin 4. Finally, it is possible to swing the sun visor body 1 together with the carrier body 6 around the approximately vertical swivel axis 25 of the upright arm of the L-shaped shaft 3 toward a front side window of a vehicle, where longitudinal displacement is again possible.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claim is:

1. A sun visor for motor vehicles comprising:
   a sun visor body for blocking light and having a first longitudinal top edge and an opposite second longitudinal bottom edge;
   a first slide bearing element coupled to the visor body along the first longitudinal edge thereof, the coupling between the visor body and the first slide bearing element prohibiting the relative rotation of the visor body around the first longitudinal edge with respect to the first slide bearing element;
   an elongate carrier body above the first top edge of the visor body for carrying the visor body, the carrier body including a third longitudinal bottom edge extending parallel to the first longitudinal edge of the sun visor body and an opposite fourth longitudinal top edge; a second slide bearing element arranged on the third longitudinal bottom edge of the carrier body; the first and second slide bearing elements being engaged for enabling translation of the visor body along the first longitudinal edge with respect to the carrier body while prohibiting rotation of the visor body around the carrier body;
   the height of the visor body between the first and second edges being substantially greater than the height of the carrier body between the third and fourth edges;
   the carrier body having opposite end regions; a bearing hole being defined in the carrier body at one end region for receiving a sun visor shaft about which the carrier body may be rotated.

2. The sun visor of claim 1, further comprising a sun visor shaft inserted into the bearing hole in the carrier body and additionally receivable in the body of a vehicle for supporting the visor body to the vehicle.

3. The sun visor of claim 1, further comprising means for receiving an outer support pin defined at the opposite end region of the carrier body; and
   the bearing hole for the sun visor shaft and the means for receiving the outer support pin together defining a swing axis for the swinging of the combined carrier body and visor body around that swing axis.

4. The sun visor of claim 3, further comprising an outer support pin insertable into the receiving means at the opposite end region of the carrier body and receivable in an outer support pedestal on the vehicle body.

5. The sun visor of claim 1, wherein the respective slide bearing elements are each comprised of respective slide rails defined on the carrier body and on the visor body and so engaged with each other as to enable longitudinal translation of the visor body along the elongate path of the rails.

6. The sun visor of claim 5, wherein each of the rails is of U-shaped cross section with a different respective width; the U-shaped rails each having an open side facing outwardly toward the other, wherein the open side of the narrower width rail is inserted into the open side of the wider width rail.

7. The sun visor of claim 6, wherein the slide rails have respective arms which define their U shapes, and the arms include longitudinally-extending grooves therein with the grooves being shaped to oppose each other and to define a pathway for bearing balls, and a plurality of bearing balls seated in the ball pathway defined by the cooperating, opposed, longitudinally extending grooves.

8. The sun visor of claim 7, further comprising a ball separator in the form of a U-shaped rail, the arms of the rail of the ball separator being located between the arms of the wider width rail and being shaped to grip over the arms of the narrower width rail, the separator having a shorter length than the length of each of the slide rails, and thereby confining the balls to a longitudinal pathway.

9. The sun visor of claim 3, further comprising a sun visor shaft having an arm; the carrier body has the bearing hole open at one end of the carrier body for receiving the arm of the sun visor shaft; the arm of the sun visor shaft being inserted into the bearing hole in the carrier body and being additionally receivable in the body of a vehicle for supporting the visor body to the vehicle;

an insertion opening in the carrier body accessible radially for the reception of a detent spring, and a detent spring inserted in the insertion opening in the carrier body and shaped and positioned for clamping the inserted arm of the sun visor shaft in the bearing hole.

10. The sun visor of claim 3, wherein the means in the carrier body for receiving the outer support pin comprises a second bearing hole aligned with the first bearing hole, the second bearing hole being for reception of an outer support pin;

an outer support pin insertable into the second bearing hole at the opposite end region of the carrier body and receivable in an outer support pedestal on the vehicle body, the outer support pin being axially movable in the second bearing hole therefore.

11. The sun visor of claim 3, wherein the visor body is comprised of plastic foam;

fastening means on the visor body for attaching the respective first slide bearing element to the visor body.

12. The sun visor of claim 11, wherein the fastening means comprises dowel elements formed in the visor body and fastening elements extending from the first slide bearing element into the dowel elements.

13. The sun visor of claim 3, wherein the sun visor body is comprised of a plastic injection molding.

14. The sun visor of claim 13, wherein the carrier body comprises a plastic injection molding, and the respective second slide bearing element for the carrier body being fixed to the plastic injection molding of the carrier body.

15. The sun visor of claim 3, wherein the carrier body comprises a plastic injection molding, and the respective second slide bearing element for the carrier body is fixed to the plastic injection molding of the carrier body.

16. The sun visor of claim 3, further comprising an outer support pedestal for receiving the outer support pin, the outer support pedestal being mountable to a vehicle body;

a chamber in the outer support pedestal for receiving an illuminating device, a cover of light transmitting material over the illuminating device chamber.

17. The sun visor of claim 10, wherein the carrier body further has a slot-like opening overlying the second bearing hole for the outer support pin, and an operating pin extending through the slot-like opening and fastened to the outer support pin, the operating pin including means thereon engageable for permitting axial displacement of the outer support pin in the second bearing hole.

18. The sun visor of claim 17, further comprising an outer support pedestal for receiving the outer support pin, the outer support pedestal being mountable to a vehicle body;

the outer support pedestal having a blind hole therein for reception of the outer support pin therein due to axial movement of the outer support pin in the blind hole;

the blind hole in the outer support pedestal for the outer support pin having a lateral, radial slot opening placed for enabling the outer support pin to be swung out of the lateral radial slot opening, freeing the sun visor body to be swung together with the carrier body away from the outer support pedestal around the visor support shaft.

* * * * *